W. H. MANNING.
COMBINED AUTOMOBILE TRUNK AND DEVICE FOR PREVENTING THEFT OF AUTOMOBILES.
APPLICATION FILED APR. 22, 1915.

1,179,445.

Patented Apr. 18, 1916.
2 SHEETS—SHEET 1.

WITNESS
C. Merion Hicks

INVENTOR
W. H. MANNING.
BY
Milton L. Crandall
ATTORNEY

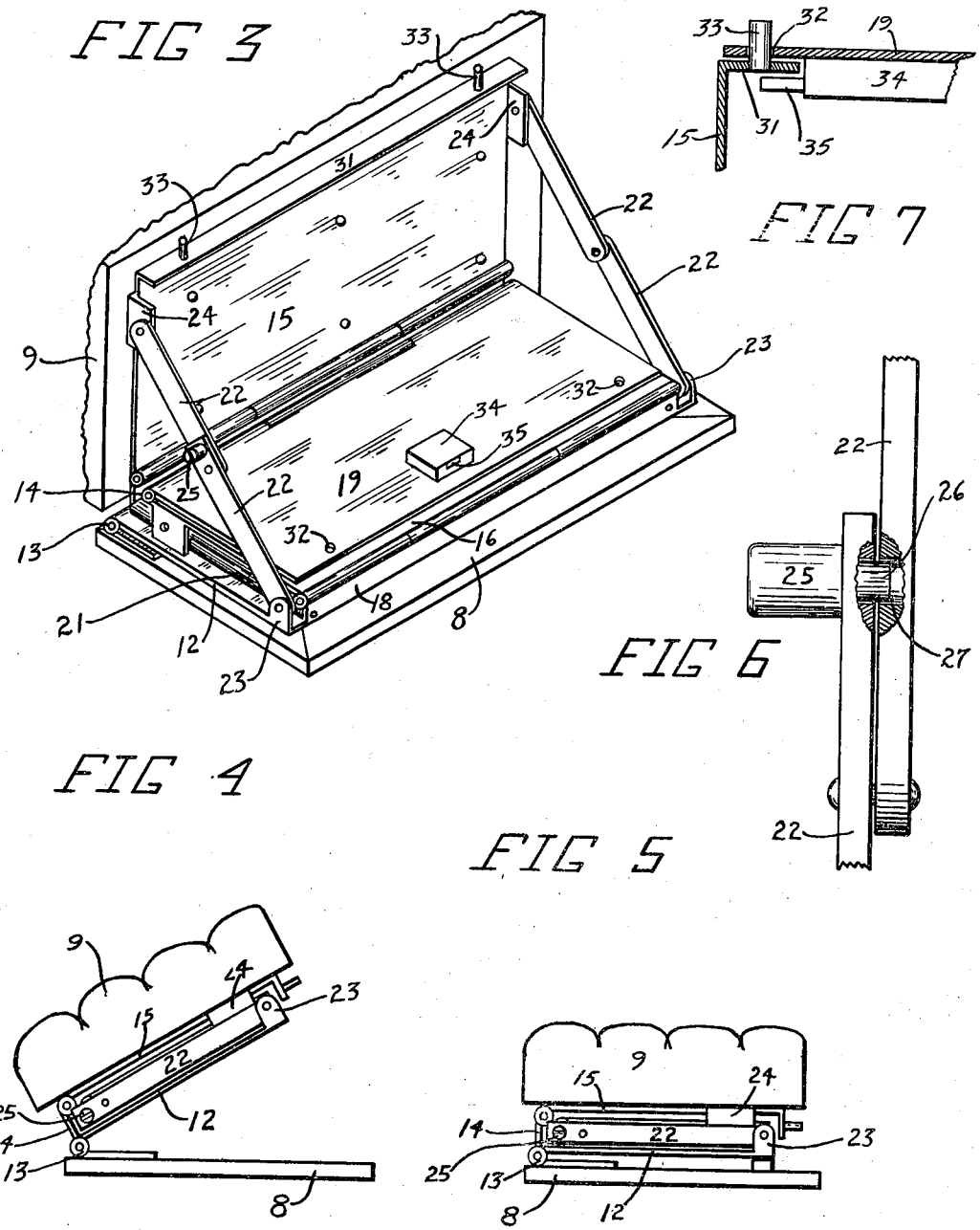

UNITED STATES PATENT OFFICE.

WILLIAM H. MANNING, OF SIOUX VALLEY TOWNSHIP, UNION COUNTY, SOUTH DAKOTA.

COMBINED AUTOMOBILE-TRUNK AND DEVICE FOR PREVENTING THEFT OF AUTOMOBILES.

1,179,445.

Specification of Letters Patent.  Patented Apr. 18, 1916.

Application filed April 22, 1915. Serial No. 23,152.

*To all whom it may concern:*

Be it known that I, WILLIAM H. MANNING, a citizen of the United States, and a resident of Sioux Valley township, in the county of Union and State of South Dakota, have invented certain new and useful Improvements in Combined Automobile-Trunks and Devices for Preventing Theft of Automobiles, of which the following is a specification.

The present invention relates to collapsible trunks.

The invention has for its primary object the production of an improved trunk particularly adapted for automobiles.

Another object of the invention is the production of an article of this class adapted to be secured to an automobile seat cushion and folded thereunder when not in use.

A further object of the invention is the production of a collapsible trunk particularly adapted to be secured below the driver's seat of an automobile and safely hold robes, wearing apparel and other valuable articles when the automobile is left unattended; and so designed as to obstruct the steering-wheel and thereby prevent theft of the vehicle.

A still further object of the invention is the production of an article of this class inexpensive in production and occupying very little space.

With these and other objects in view, the invention, consisting in the construction, combination and novel arrangement of parts, will be fully understood from the following description, reference being had to the accompanying drawings, which form a part of this application and in which like characters of reference indicate corresponding parts throughout the several views, of which,—

Figure 2:
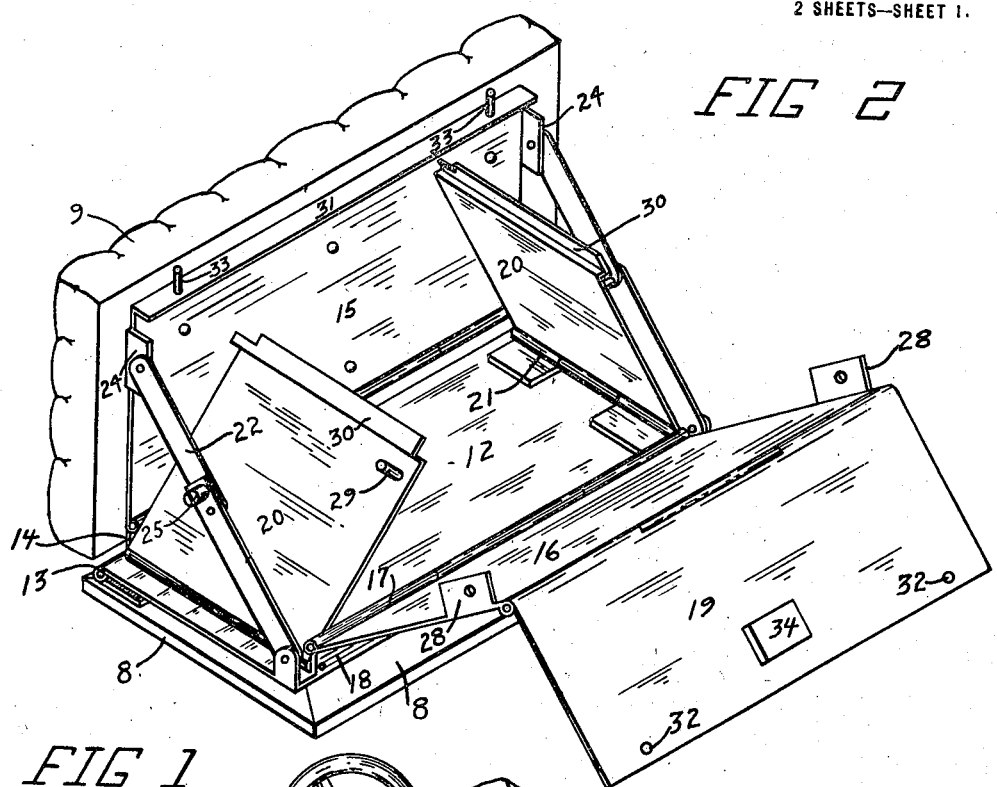
Figure 1:
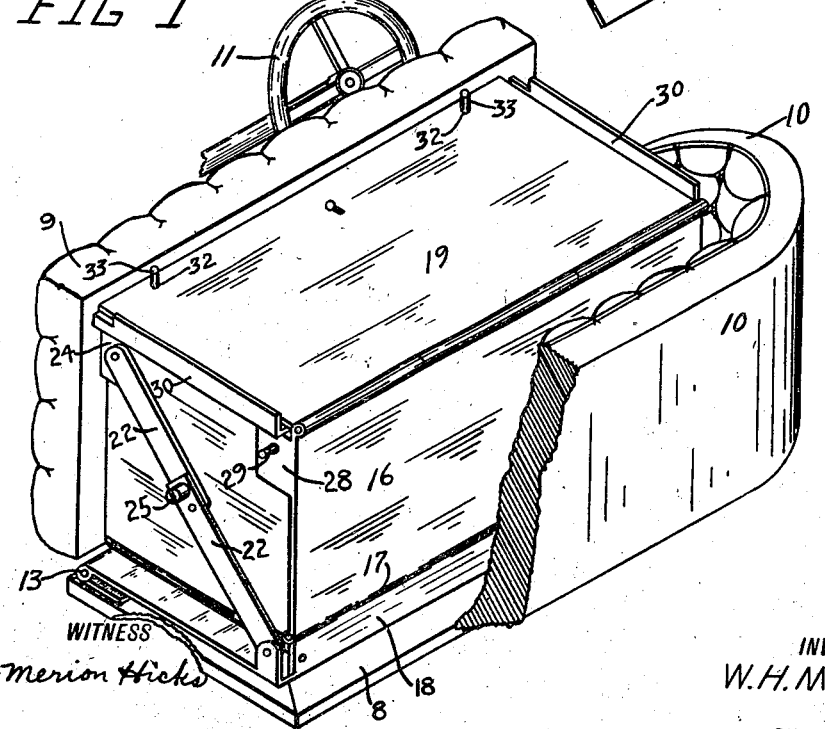

Figure 1 is a fragmentary perspective view of the front seat of an automobile equipped with the preferred embodiment of the invention, the trunk being in position as in use; Fig. 2 is a similar view of the trunk partly unfolded; Fig. 3 is a similar view of the same partly folded; Fig. 4 is a side elevation of the same with the cushion partly raised; Fig. 5 is a similar view with the trunk folded and the cushion in normal position; Fig. 6 is an enlarged rear elevation of the toggle-joint, portions being cut away to reveal the lock mechanism; and Fig. 7 is an enlarged vertical section of the cover and parts associated therewith.

Although I have illustrated and hereinafter described the preferred embodiment of the invention, I would not be understood as being limited to the specific structure chosen for illustration, for various alterations and modifications in the details of construction and arrangement of parts may be made without departing from the spirit and scope of the invention as defined in the appended claims.

Referring now to the illustrations, 8 represents the usual front seat frame, of an automobile, for the support of the cushion, 9. 10—10 are the back and side portions of the seat, and 11 the steering wheel.

The trunk is preferably constructed of sheet-metal and comprises a bottom, or floor, 12, the forward edge of which is hingedly-secured, as at 13, to the front edge of the seat-frame, and is formed with an upwardly-disposed flange, 14, to which is hingedly secured the lower edge of the front wall, 15.

16 is the rear wall of the trunk, hinged at its lower edge, 17, to a flange, 18, on the floor; and to the upper edge thereof is hinged the cover, 19. The side walls, 20, are hinged, as at 21 (Fig. 2), to the floor.

The front wall of the trunk is supported in upright position by toggle-jointed bars, 22, pivotally-secured to ears, 23 and 24, on the side edges of the floor and front wall, respectively.

One of the toggles extends a distance beyond the nodal point and carries upon its extended end a suitable lock, 25, the lockbolt of which, 26, is adapted to enter a transverse opening, 27, in the adjacent toggle member and thereby hold the bars rigidly and support the front wall in the position shown in Figs. 1, 2 and 3.

The cushion is secured in any suitable permanent manner to the front wall of the trunk. It will be observed, therefore, that when the front wall is locked as above described, the cushion will so obstruct the steering-wheel as to prevent the vehicle being readily driven away.

The rear wall of the trunk is provided with forwardly-disposed flanges, 28, which embrace the outer sides of the side walls and are apertured to inclose studs, 29, on said walls, which studs serve to prevent rearward movement of the rear wall.

The cover rests upon outwardly-off-set portions, 30, on the side walls, the upper edges of which portions engage the cover and prevent inward displacement of the side walls. The front edge of the cover rests upon a flange, 31, on the front wall and is provided with openings, 32, which inclose studs, 33, on said flange. On the under side of the cover is mounted a suitable lock, 34, the lock-bolt, 35, of which, is adapted to engage the under side of the flange 31, and thereby prevent raising of the cover and collapsing of the trunk.

The entire device may be hinged to swing forwardly, as indicated in Fig. 4, to afford access to the interior of the seat, which portion often contains the fuel-tank, tools or other equipment.

To collapse the trunk the cover is raised and the side walls swung inwardly upon the floor. The rear wall is then swung inwardly adjacent the side members and the cover turned rearwardly to rest upon the outer side of the rear wall. The toggle-bars are then unlocked to permit the cushion to assume its normal position.

Having thus described my invention what I claim as new and desire to secure by Letters Patent of the United States, is,—

1. The combination with an automobile front seat-frame and its cushion, of a collapsible trunk including a bottom having its front edge hinged to the seat-frame, front and rear walls hinged to the bottom, engageable by the rear wall to prevent their outward movement and having off-set upper parts, a cover hinged to the rear wall and adapted to be locked to the front wall and engage said off-set parts to prevent inward movement of the side walls, and means for locking the front wall at substantially right-angles to the bottom.

2. The combination with an automobile having a steering-wheel, a driver's seat and its cushion, of a trunk carried by the seat and having a part movable to horizontal and vertical positions, the cushion and said part being interconnected and so related that the cushion will obstruct and prevent access to the steering-wheel when said part is in a substantially vertical position, and means for locking said part in the latter position.

In testimony whereof I have hereunto set my hand in presence of two subscribing witnesses.

WILLIAM H. MANNING.

Witnesses:
M. S. CRANDALL,
C. MERION HICKS.